United States Patent
Gollier

(10) Patent No.: US 7,492,507 B1
(45) Date of Patent: Feb. 17, 2009

(54) WAVELENGTH CONVERSION DEVICES AND FABRICATION METHODS FOR THE SAME

(75) Inventor: Jacques Gollier, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/192,397

(22) Filed: Aug. 15, 2008

(51) Int. Cl.
*G02F 1/35* (2006.01)
(52) U.S. Cl. .................. 359/326; 359/332; 385/122
(58) Field of Classification Search ......... 359/326–332; 372/21–23; 385/122
See application file for complete search history.

(56) References Cited

U.S. PATENT DOCUMENTS

| | | | |
|---|---|---|---|
| 5,185,752 | A | 2/1993 | Welch et al. |
| 5,644,584 | A | 7/1997 | Nam et al. |
| 6,021,141 | A | 2/2000 | Nam et al. |
| 6,542,285 | B1 * | 4/2003 | Batchko et al. ............. 359/326 |
| 6,996,140 | B2 | 2/2006 | Waarts et al. |
| 7,123,792 | B1 | 10/2006 | Mears et al. |
| 7,236,674 | B2 | 6/2007 | Mizuuchi et al. |
| 2004/0131093 | A1 | 7/2004 | Waarts et al. |
| 2004/0252733 | A1 | 12/2004 | Huang |
| 2006/0051025 | A1 * | 3/2006 | Mizuuchi et al. .............. 385/40 |
| 2006/0233206 | A1 | 10/2006 | Miner et al. |
| 2008/0231942 | A1 * | 9/2008 | Huang et al. ................. 359/326 |

FOREIGN PATENT DOCUMENTS

JP  2006332447  12/2006

OTHER PUBLICATIONS

Abernethy, J.A. et al., Demonstration and optical characteristics of electro-optic Bragg modulators in periodically poled lithium niobate in the near-infrared, Applied Physics Letters, Sep. 30, 2002, vol. 81, No. 14.

* cited by examiner

*Primary Examiner*—Hemang Sanghavi
(74) *Attorney, Agent, or Firm*—Gregory V. Bean; James E. Beyer; Dinomore & Shohl, LLP

(57) ABSTRACT

Particular embodiments of the present invention relate generally to semiconductor lasers and wavelength conversion devices and, more particularly, to wavelength conversion devices and methods of fabrication thereof that reduce back reflections of light from the wavelength conversion device to the laser. According to one embodiment of the present invention, a wavelength conversion device comprising a nonlinear optical material is poled with domains comprising randomly varying domain widths defined by an ideal poling period $\Lambda_I$ plus or minus a disruption value. According to another embodiment, the wavelength conversion device comprises a plurality of sequentially positioned ideal poling domains and one or more non-ideal poling domains. The ideal poling domains comprise a domain width of the ideal poling period $\Lambda_I$ while the non-ideal poling domains comprise a domain width of the ideal poling period $\Lambda_I$ plus or minus a discontinuity value.

21 Claims, 5 Drawing Sheets

WAVELENGTH CONVERSION DEVICES AND FABRICATION METHODS FOR THE SAME

CROSS REFERENCE TO RELATED APPLICATIONS

The present application is related to co-pending and commonly assigned U.S. patent application Ser. No. 11/978,864 (SP07-218) filed on Oct. 30, 2007, for WAVELENGTH CONVERSION DEVICES AND FABRICATION METHODS FOR THE SAME, but does not claim priority thereto.

BACKGROUND OF THE INVENTION

The present invention relates generally to wavelength conversion devices and fabrication methods for the same. More particularly, some embodiments of the present invention relate wavelength conversion devices and methods of fabrication thereof that utilize poling period manipulation to reduce Bragg resonance and corresponding back reflections of light while maintaining an effective conversion efficiency of the wavelength conversion device.

BRIEF SUMMARY OF THE INVENTION

Wavelength conversion devices, which may comprise periodically poled nonlinear optical material such as lithium niobate, may be configured to double the frequency of an input signal generated by a laser by employing quasi-matching through the use of periodically inverted domains within the nonlinear optical material. However, these periodically inverted domains may create unwanted Bragg resonance at the phase matching wavelength (i.e., the wavelength of an input signal at which the wavelength conversion device doubles the frequency of the input signal at a maximum efficiency) of the poled nonlinear optical material, which causes undesirable back reflections from the wavelength conversion device to the laser that adversely affect the stability of the laser when the reflection occurs in the fundamental wavelength. Additionally, if the Bragg resonance occurs within the frequency doubled wavelength, a Bragg resonance can cause significant drop in emitted power. Embodiments of the present invention reduce the back reflections to the laser by manipulating the poling period of the periodically poled nonlinear optical material to destroy the Bragg resonance caused by the poling domains, thus increasing the stability of the laser.

According to one embodiment of the present invention, a method of fabricating a wavelength conversion device comprising a nonlinear optical material having an input face, an output face and a waveguide region extending from the input face to the output face is provided. According to the method, the wavelength conversion device is fabricated by identifying a phase matching wavelength $\lambda_\Phi$ of the wavelength conversion device and determining an ideal poling period $\Lambda_1$ for the phase matching wavelength $\lambda_\Phi$ of the wavelength conversion device. The nonlinear optical material is poled by inducing into the waveguide region sequentially positioned domains comprising randomly varying domain widths defined by the ideal poling period $\Lambda_I$ plus or minus a disruption value such that a Bragg resonance and corresponding back reflections of light from the wavelength conversion device poled at the randomly varying domain widths to the laser are at least an order of magnitude less than the Bragg resonance and back reflections of a nonlinear optical material poled at the ideal poling period $\Lambda_I$. The conversion efficiency of the input signal by the wavelength conversion device poled with the randomly varying domain widths is at least half the maximum conversion efficiency.

According to another embodiment of the present invention, a method of fabricating a wavelength conversion device comprising a nonlinear optical material having an input face, an output face and a waveguide region extending from the input face to the output face is provided. According to the method, the wavelength conversion device is fabricated by identifying a phase matching wavelength $\lambda_\Phi$ of the wavelength conversion device and determining an ideal poling period $\Lambda_I$ for the phase matching wavelength $\lambda_\Phi$ of the wavelength conversion device. The nonlinear optical material is poled by inducing into the waveguide region a plurality of sequentially positioned domains comprising a plurality of ideal poling domains and one or more non-ideal poling domains, wherein the non-ideal poling domains comprise a width defined by the ideal poling period $\Lambda_I$ plus or minus a discontinuity value and the ideal poling domains comprise a width defined by the ideal poling period $\Lambda_I$. The discontinuity value is selected such that the phase of light reflected by the second half of the waveguide region is in opposition of phase with the light that is reflected by the first half of the waveguide region and a conversion efficiency of the input signal by the wavelength conversion device poled with the non-ideal poling domain is at least half of the maximum conversion efficiency.

According to another embodiment of the present invention, a wavelength conversion device is provided. More specifically, according to the embodiment of the present invention, the wavelength conversion device comprises a nonlinear optical material having an input face, an output face and a waveguide region extending from the input face to the output face. The waveguide region further comprises a plurality of sequentially positioned domains having randomly varying domain widths defined by an ideal poling period $\Lambda_I$ plus or minus a disruption value. The disruption value, which is less than the ideal poling period $\Lambda_I$, is such that Bragg resonance and corresponding back reflections of light are at least an order of magnitude less than Bragg reflections of light of a nonlinear optical material poled at the ideal poling period $\Lambda_I$. The disruption value is also such that the conversion efficiency of the input signal by the wavelength conversion device having randomly varying domain widths is at least half the maximum efficiency of a nonlinear optical material poled at the ideal poling period $\Lambda_I$.

According to another embodiment of the present invention, a wavelength conversion device comprising a nonlinear optical material having an input face, an output face and a waveguide region extending from the input face to the output face is provided. More specifically, the waveguide region according to one embodiment comprises a plurality of ideal poling domains and one or more non-ideal poling domains. The non-ideal poling domains comprise a width defined by the ideal poling period $\Lambda_I$ plus or minus a discontinuity value that is less than the ideal poling period $\Lambda_I$, and the ideal poling domains comprise a width defined by the ideal poling period $\Lambda_I$.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
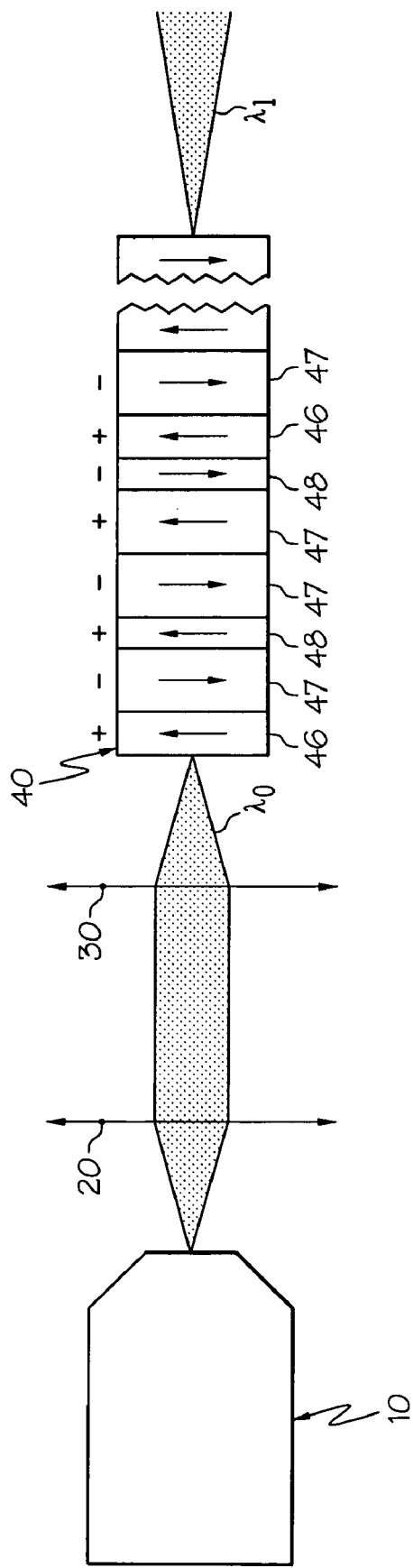
FIG. 1 is a schematic illustration of a DBR or similar type semiconductor laser optically coupled to a light wavelength conversion device according to one or more embodiments of the present invention.

The present invention relates generally to semiconductor lasers and wavelength conversion devices, such as second harmonic generation crystals (SHG), which may be configured in a variety of ways. For example and by way of illustration, not limitation, short wavelength sources can be configured for high-speed modulation by combining a single-wavelength semiconductor laser, such as a distributed feedback (DFB) laser, a distributed Bragg reflector (DBR) laser, a vertical cavity surface-emitting laser (VCSEL), a vertical external cavity surface-emitting laser (VECSEL) or a Fabry-Perot laser with a light wavelength conversion device, such as an SHG crystal.

As will be appreciated by those familiar with laser design, DFB lasers are resonant-cavity lasers using grids or similar structures etched into the semiconductor material as a reflective medium. DBR lasers are lasers in which the etched Bragg grating is physically separated from the electronic pumping area of the semiconductor laser. On the other hand, a Fabry-Perot laser has no wavelength selective section and, therefore generates multiple wavelengths. To operate the Fabry-Perot laser in single mode, it is therefore necessary to introduce a wavelength selective component into the optical path to reflect some light towards the diode and stabilize the wavelength. This function can be achieved by integrating a Bragg grating over a portion of an SHG crystal waveguide. It is contemplated that these and other types of lasers may be utilized in accordance with the present invention.

The wavelength conversion device may comprise an SHG crystal. Although SHG crystals create an output signal having a frequency that is double the frequency of the original or input optical signal, these signals become out of phase with one another. As light travels the waveguide region, light at the fundamental (i.e., input) and second-harmonic wavelengths become out of phase such that a second-harmonic signal that is generated near the input face of the wavelength conversion device will be out of phase with a second-harmonic light signal that is generated near the output face of the wavelength conversion device. This results in the generation of very little second-harmonic light. To obtain constructive phase matching between the second-harmonic light signals that are generated in the wavelength conversion device, quasi-phase matching is employed. Quasi-phase matching may be achieved by introducing periodically inverted poling domains within the waveguide region of the nonlinear material. The poling consists of periodically inverting the orientation of the crystallographic axis of the wavelength conversion device in order to insure that both infrared and visible light stay nearly in phase along the propagation of the wavelength conversion device. By introducing a phase shift at each domain, a resultant phase correction is achieved. Nonlinear optical materials suitable for a SHG crystal may include, but is not limited to, periodically poled lithium niobate (PPLN), periodically poled lithium tantalate (PPLT), and periodically poled potassium titanyl phosphate (PPKTP), for example. Poling may be induced into the wavelength conversion device by many processes, including, for example, electron beam scanning, application of an electric field, or growth of the crystal.

The wavelength conversion device may generate higher harmonic waves of the fundamental laser signal by tuning, for example, a 1060 nm DBR or DFB laser to the spectral center of the wavelength conversion device, which converts the wavelength to 530 nm. However, in such a higher harmonic wave generating system, an important parameter is the wavelength stability of the laser diode. The wavelength conversion efficiency of a wavelength conversion device, such as MgO-doped PPLN, is strongly dependent on the wavelength matching between the laser diode and the wavelength conversion device. The conversion efficiency of the wavelength conversion device is a very narrow function of the wavelength so that any wavelength instability generates intensity fluctuations of the frequency doubled light.

The present inventors have recognized that back reflections coming from the wavelength conversion device and re-injected into the semiconductor laser play a key role for wavelength stability. Lasers such as DBR lasers are very sensitive to feedback and can become unstable in wavelength with feedback levels as low as −60 to −70 dB. For example, Bragg gratings may cause back reflections in a laser system. The present inventors have also recognized that, although a wavelength conversion device such as a periodically poled SHG crystal may not intentionally comprise induced Bragg gratings in a DBR or DFB laser system, the bulk of the SHG crystal presents some periodic or nearly periodic features such as the crystal poling or other features associated with the way that the crystal waveguide is made. These features may act like unwanted Bragg gratings and generate significant feedback to the laser diode. These Bragg reflections can generate laser instability when they occur at the fundamental wavelength and/or power drops when they occur at the frequency doubled wavelength.

Given the challenges associated with wavelength matching and stabilization in developing semiconductor laser sources, embodiments of the present invention relate to wavelength conversion devices and methods of fabrication to minimize back reflections from the wavelength conversion device to a semiconductor laser, thereby increasing semiconductor laser wavelength stability. Although the concepts of the present invention are described primarily in the context of DBR lasers, it is contemplated that the control schemes discussed herein will also have utility in a variety of types of semiconductor lasers, including but not limited to DFB lasers, Fabry-Perot lasers, VCSELS, VECSELS and many other types of external cavity lasers.

Referring to FIG. 1, a laser (e.g., a DBR laser) 10 is optically coupled to a light wavelength conversion device 40 comprising a nonlinear optical material. The input optical signal of wavelength $\lambda_0$ emitted by the semiconductor laser 10 may be either directly coupled into the wavelength conversion device 40 or may be coupled through collimating and focusing optics 20, 30 or some other type of suitable optical element or optical system. The wavelength conversion device 40 converts the input optical signal wavelength $\lambda_0$ emitted by the semiconductor laser 10 into higher harmonic waves. This type of configuration is particularly useful in generating shorter wavelength laser beams from longer wavelength semiconductor lasers and can be used, for example, as a visible laser source for laser projection systems. The input optical signal $\lambda_0$ may comprise wavelengths of visible light, infrared, near-infrared and ultra-violet, for example.

The wavelength conversion device 40 is illustrated in FIG. 1 as a nonlinear SHG crystal. The input optical signal with a wavelength $\lambda_0$ and a frequency $\omega_0$ is passed into an input face of the wavelength conversion device 40 and propagates along an optical path toward the output face. The optical path, which may be referred to as the waveguide region, is the path taken by light within the wavelength conversion device 40 that extends from the input face to the output face. An output optical signal $\lambda_1$ of a doubled frequency $2\omega_0$ emerges from the output face of the wavelength conversion device 40.

The wavelength conversion efficiency of the wavelength conversion device 40 illustrated in FIG. 1 is dependent on the wavelength matching between the semiconductor laser 10 and the wavelength conversion device 40. The output power of the higher harmonic light wave generated in the wavelength conversion device 40 drops drastically when the output wavelength of the laser 10 deviates from the wavelength conversion bandwidth of the wavelength conversion device 40. In applications involving a laser 10 such as a DBR source laser and a PPLN crystal as a wavelength conversion device 40 for frequency doubling, it is desirable that the light does not get reflected and coupled back into the laser diode of the laser 10. External cavity feedback can make the laser 10 become very unstable in wavelength. The conversion efficiency of the wavelength conversion device 40 is very sensitive to wavelength variations and as a consequence, feedback in the form of back reflections can create significant fluctuations of the frequency doubled power. Additionally, in applications such as nonlinear frequency doubling in a laser projection system, a laser diode having the highest possible power, such as several hundred milliwatts, is required to achieve sufficient conversion efficiencies.

As described above, Bragg-like gratings within the wavelength conversion device 40 may cause significant feedback to the laser 10. These Bragg-like gratings result from the poling and indices of refraction of the wavelength conversion device 40. Where a DBR or DFB laser 10 is used to pump the wavelength conversion device 40, the laser diode itself includes a Bragg grating. In this case, the wavelength conversion device 40 does not intentionally comprise a Bragg grating. However, SHG and other similar crystals possess inherent and undesirable Bragg gratings that are a result of the poling process. For example, local stress may be introduced into the wavelength conversion device 40 during the poling process which may result in a variation of the index of refraction. Additionally, any residual voltage resulting from the poling process may generate a different index of refraction for the regions that are poled and not poled. Non-perfect local inversion of the crystal may create scattering centers in the structure. These periodic scattering structures may generate resonances in a similar manner as an index variation Bragg grating. The Bragg resonances within the wavelength conversion device 40 can cause significant back reflections and create instability in the laser 10.

Figure 2:
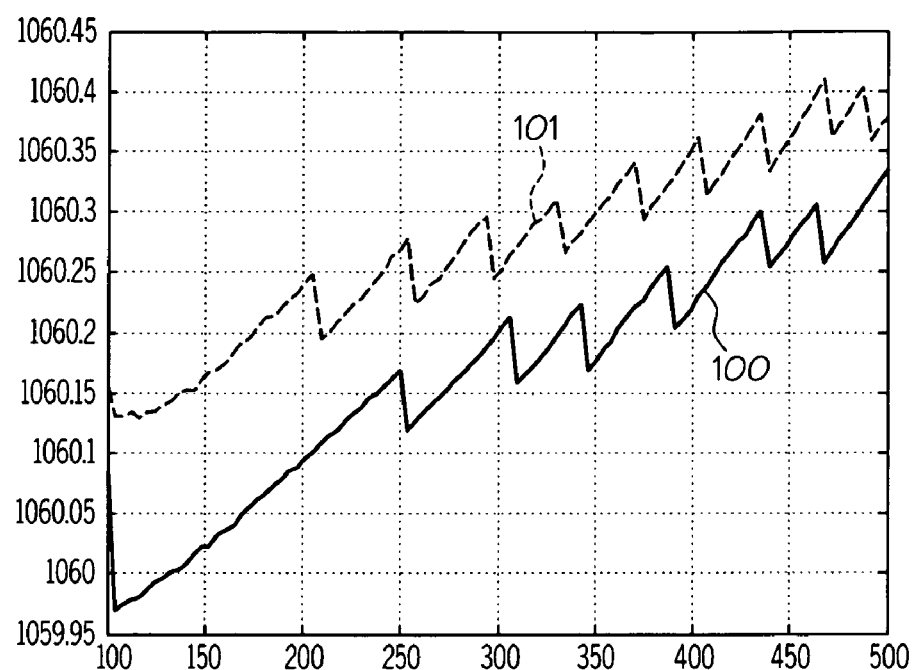
FIGS. 2 and 3 illustrate the evolution of emission wavelength as a function of gain current in a DBR laser.
Figure 3:
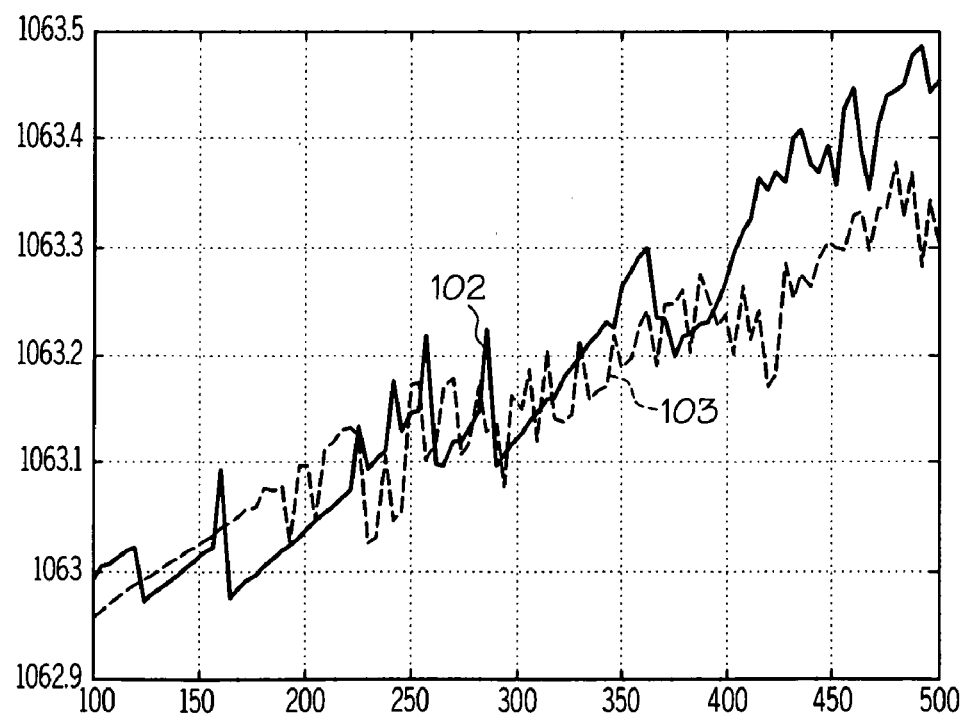

FIGS. 2 and 3 illustrate the impact of the back reflections on the stability of the laser. FIG. 2 illustrates the source wavelength as a function of the current in the gain section of the laser 10 (about 1060 nm) at a wavelength where there is no significant Bragg resonance. The solid line 100 corresponds to a first laser diode package while the dashed line 101 corresponds to a second laser diode package. The wavelength of the lasers remain relatively stable, although there is a gradual increase of the wavelength with some sudden fluctuations associated with the mode hop of the laser. On the other hand, FIG. 3 illustrates an example of the source wavelength of the first laser package 102 and the second laser package 103 where significant Bragg resonance is present (at about 1063 nm). As can be seen in FIG. 3, both laser diode packages experience significant instability due to back reflections from the wavelength conversion device 40 resulting from the Bragg resonance at the phase matching wavelength $\lambda_\Phi$. Therefore, to avoid back reflections, the wavelength conversion device 40 should be designed and fabricated in such a way that the Bragg resonance does not occur, or is significantly minimized, at the phase matching wavelength $\lambda_\Phi$.

As noted above, particular embodiments of the present invention generally relate to the fabrication of a wavelength conversion device 40 to minimize back reflections from the wavelength conversion device 40 to a semiconductor laser 10. More specifically, the present inventors have recognized that varying or disrupting an ideal poling period $\Lambda_I$ for the phase matching wavelength $\lambda_\Phi$ of the wavelength conversion device 40 will insure that the Bragg resonance curve is altered or minimized at the laser phase matching wavelength $\lambda_\Phi$. Consequently, back reflections from the wavelength conversion device 40 to the laser 10 are significantly minimized.

According to some embodiments of the present invention, a desired phase matching wavelength $\lambda_\Phi$ should be identified. As described above, the phase matching wavelength $\lambda_\Phi$ is the lasing wavelength of a signal emitted by a laser at which the wavelength conversion device converts the frequency of the signal at a maximum conversion efficiency. Because nonlinear optical materials possess slightly different refractive indices at the input wavelength (i.e., fundamental wavelength) and converted wavelength (i.e., second harmonic wavelength), as light that propagates through the wavelength conversion device, the input and converted wavelengths become out of phase, as described above. The two wavelengths interfere destructively, thus very little converted light is outputted from the wavelength conversion device. However, an output signal having a significantly increased intensity may be achieved by introducing into the SHG crystal (such as PPLN) a plurality of phase-shifting domains at an ideal poling periodicity $\Lambda_I$.

At the ideal poling period $\Lambda_I$, the phase of the light that is propagating through the wavelength conversion device is inverted 180° before the occurrence of any destructive interference, such that only constructive interference is present and the intensity of the converted wavelength builds as the light travels the length of the wavelength conversion device. The ideal poling period $\Lambda_I$ for a phase matching wavelength $\lambda_\Phi$ may be determined by:

$$\Lambda_I = \frac{\lambda_\Phi}{2(\eta_{2\upsilon} - \eta_\upsilon)}, \quad (1)$$

where:
$\Lambda_I$ is the anti-back reflective periodicity of the poled nonlinear optical material,
$\eta_{2\upsilon}$ is the converted frequency effective index of refraction of the poled nonlinear optical material, and
$\eta\upsilon$ is the input frequency effective index of refraction of the poled nonlinear optical material.

Referring once again to FIG. 1, embodiments may destroy Bragg resonance and significantly reduce back reflections from the wavelength conversion device 40 by randomly varying the domain widths of the sequentially positioned poling domains within the waveguide region rather than poling the crystal at the ideal poling period $\Lambda_I$ determined above. The randomly varying domain widths may be also described as a random noise that is introduced onto the position of the poling domains. By randomly varying the domain widths, the non-linear optical material is or becomes slightly non-periodic, or quasi-periodic, while still maintaining a periodicity that effectively doubles the frequency of the input signal. Bragg resonance is thereby reduced or eliminated in a wavelength conversion device poled in such a manner because the waveguide region is no longer truly periodic. Therefore, back reflections are significantly reduced at the phase matching wavelength $\lambda_\Phi$, and the laser 10 remains stable. The widths of the domains in the wavelength conversion device 40 illustrated in FIG. 1, which are exaggerated for illustrative purposes, vary in width by the ideal poling period $\Lambda_I$ plus or minus a disruption value. The disruption value should be significantly smaller than the ideal poling period $\Lambda_I$. A disruption value that is too large will affect the conversion efficiency from the fundamental wavelength to the frequency doubled wavelength, which will reduce or completely destroy the generation of second-harmonic of light. Therefore, a disruption value should be chosen that reduces the Bragg resonance of the wavelength conversion device 40 and corresponding back reflections of light while also maintaining the conversion efficiency of the wavelength conversion device 40 at or near the maximum efficiency. Ideal poling domains 46 have a domain width determined by the ideal poling period $\Lambda_I$, while large domains 47 are larger than the ideal domains 46 by the disruption value, and small domains 48 are smaller than the ideal domains 46 by the disruption value. The domains 46-48 may be varied along the length of the waveguide region, and, to achieve the highest level of conversion efficiency, should average the ideal poling period $\Lambda_I$.

Figure 4:
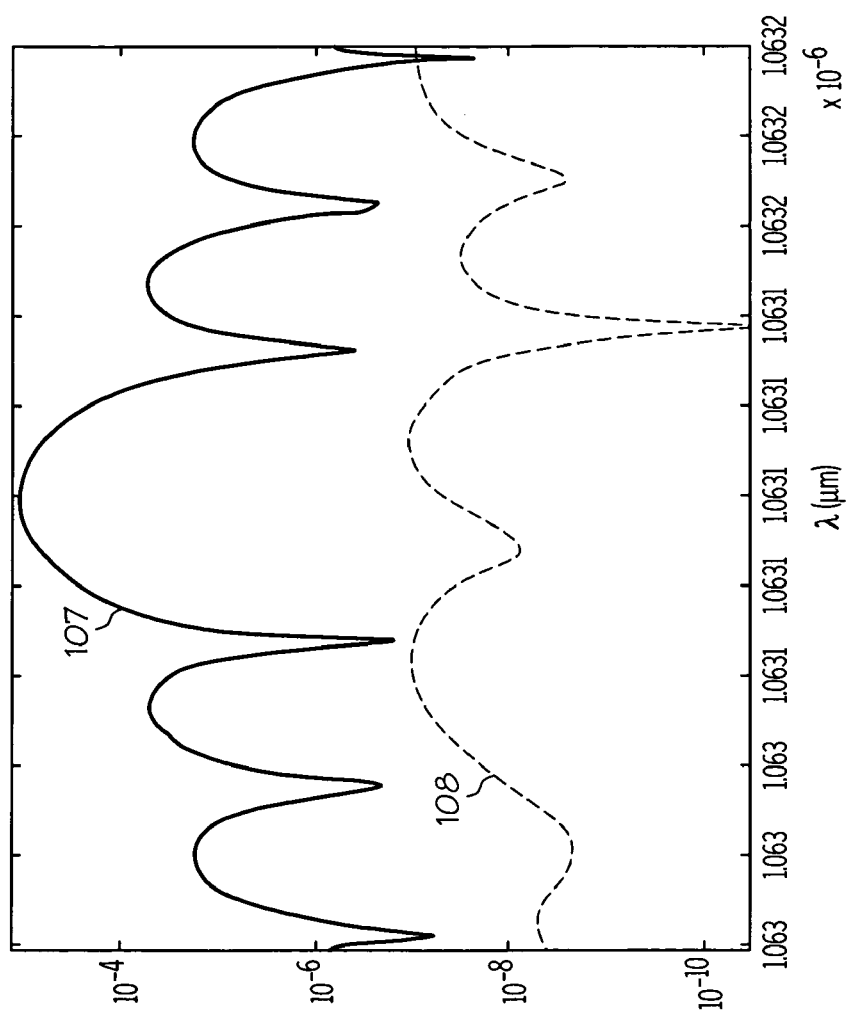
FIG. 4 is a graph that illustrates a Bragg resonance curve of a wavelength conversion device according to one or more embodiments of the present invention.

FIG. 4 is a logarithmic graph that depicts the Bragg resonance of two poled PPLN crystals with respect to input wavelength. Curve 107 is the Bragg resonance of a crystal poled at the ideal poling period $\Lambda_I$ and curve 108 is the Bragg resonance of an exemplary wavelength conversion device 40 poled with randomly varying domain widths. In the illustrated example, the ideal poling period $\Lambda_I$ is 3.3 microns, and the disruption value is 0.1 microns. Therefore, the exemplary wavelength conversion device 40 of curve 108 is poled with domains that randomly vary in width at 3.2, 3.3 and 3.5 microns rather than 3.3 microns of the ideal poling period $\Lambda_I$. As may be seen from the graph, the Bragg resonance resulting from the periodic domains of the wavelength conversion device poled at the ideal poling period $\Lambda_I$ is significantly more prevalent than the Bragg resonance of the exemplary wavelength conversion device 40. The disruption value of 0.1 microns is large enough to alter the periodicity to eliminate back reflections resulting from Bragg resonance, yet small enough to not significantly impact the conversion efficiency of the crystal, i.e., the exemplary wavelength conversion device has a conversion efficiency that remains near the maximum conversion efficiency of a crystal poled at the ideal poling period $\Lambda_I$.

Other embodiments may reduce back reflections from the wavelength conversion device 40 to the laser 10 by introducing a small discontinuity or discontinuities into one or more non-ideal poling domains within the waveguide region. A variation or discontinuity as small as 0.1 microns on the position of the poled regions has a significant impact on the Bragg resonance. The discontinuity provides that light reflected by the second half of the waveguide is in opposition of phase with the light that is reflected by the first half To ensure that the waves of the back-reflected light are shifted by one half of a wavelength, forward and backward propagations should be considered. Therefore, the shift in phase should be approximately a quarter wave. The width of the discontinuity $D_w$ imposed upon the non-ideal poling domain may be defined as:

$$D_w \approx \frac{\frac{\lambda_{br}}{4} + k\left(\frac{\lambda_{br}}{2}\right)}{\eta},$$

where:
$\lambda_{br}$ is the wavelength of the back reflected light,
k is an integer number, and
$\eta$ is the index of refraction of the nonlinear optical material.

Figure 5:
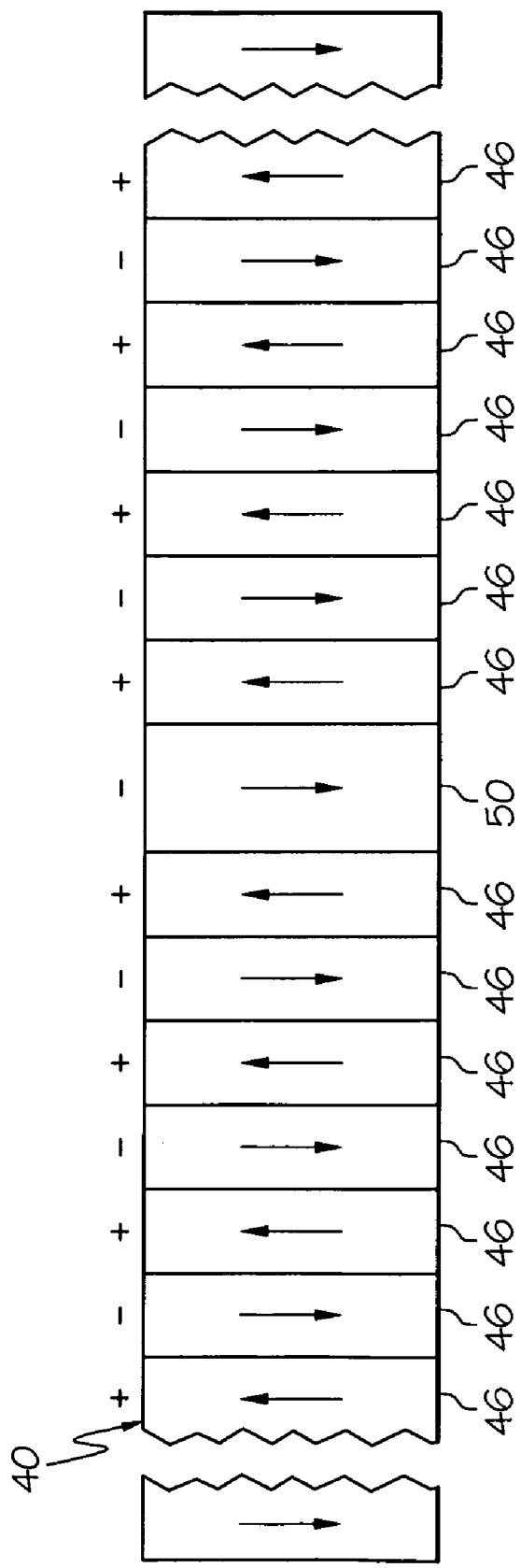
FIG. 5 is a schematic illustration of a wavelength conversion device according to one or more embodiments of the present invention.

The embodiment illustrated in FIG. 5 comprises a plurality ideal poling domains 46 that have a domain width equal to the ideal poling period $\Lambda_I$ as defined above, and one non-ideal poling domain 50 that has a width equal to the ideal poling period $\Lambda_I$ plus a discontinuity value. Although FIG. 5 illustrates only one non-ideal poling domain, embodiments may comprises one or more non-ideal poling domains, as well as a width defined by the ideal poling period $\Lambda_I$ minus the discontinuity value.

As an example, a crystal having an index of refraction of 2.2 and considering the fact that the light makes a round trip within the wavelength conversions device 40, a non-ideal poling domain having a discontinuity value of 0.1 microns increases the optical path length by 0.44 microns, which at an input signal of 1.062 microns is close to half a wave. Therefore, very small variations of the poling position that shift the phase of the back reflected light by one half of a wavelength of the back reflected light can transform constructive interferences into destructive ones and thereby considerably change the shape of Bragg resonance at the phase matching wavelength $\lambda_\Phi$. Additionally, so long as the discontinuity value applied to the non-ideal poling domain or domains remain much smaller than the period of the poling itself (i.e., by at least an order of magnitude), the non-ideal poling domains have very little impact on the crystal conversion efficiency curve.

Figure 6:
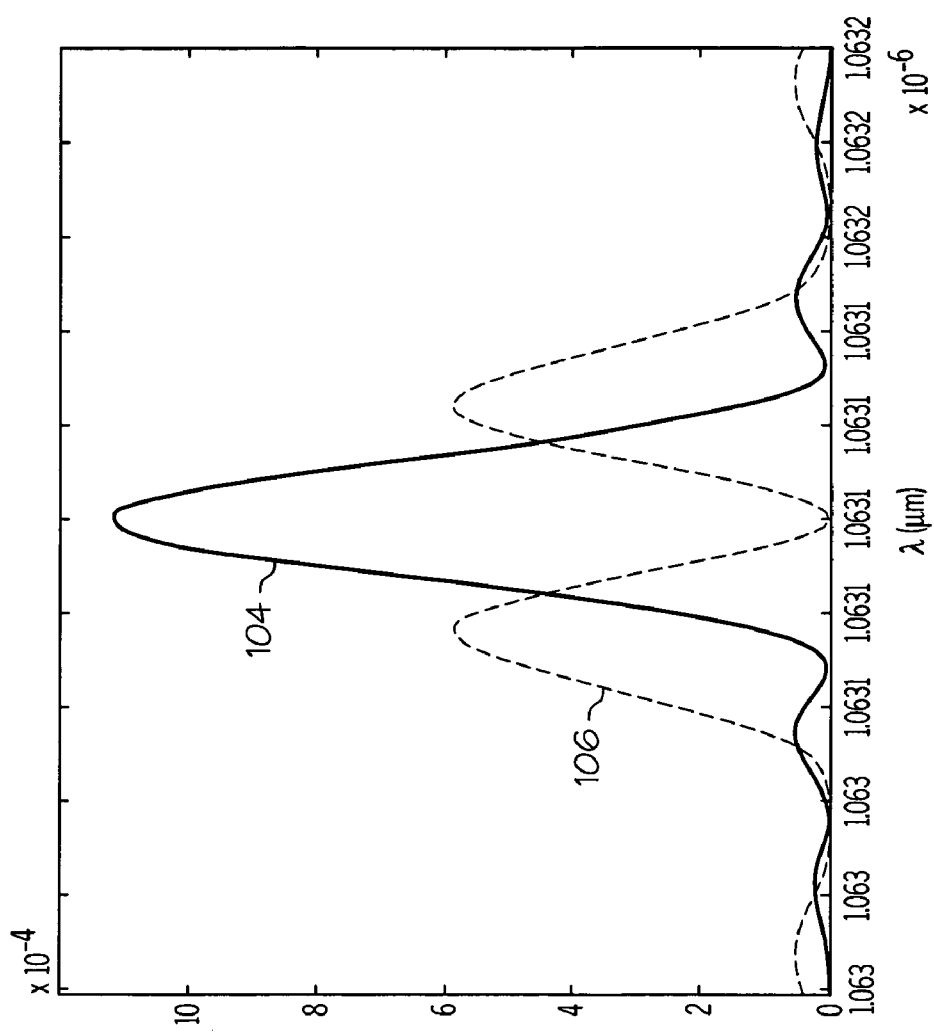
FIG. 6 is a graph that illustrates a Bragg resonance curve of a wavelength conversion device according to one or more embodiments of the present invention.

FIG. 6 illustrates a graph depicting Bragg resonance of a 8 mm long crystal with respect to input wavelength. Curve 104 is the Bragg resonance for a continuously periodic grating within the waveguide region of the wavelength conversion device 40, while curve 106 is the Bragg resonance for a wavelength conversion device that comprises a non-ideal poling domain that is 0.122 microns larger than the ideal poling period $\Lambda_I$. Being given the index of refraction of the waveguide, that discontinuity corresponds to a quarter of wavelength. As may be seen from the graph, the Bragg resonance of the curve 104 possesses a large peak at the phase matching wavelength, which causes significant and disruptive back reflections to the laser 10. However, moving the poling regions by 0.122 with a non-ideal poling domain near the center of the waveguide region causes a phase flip at the center of the curve 106. Although the exemplary wavelength conversion device 40 comprises a non-ideal poling domain at the center of the waveguide region, one or more non-ideal poling domains may be located at any position within the waveguide region so long Bragg resonance is minimized. Presenting a discontinuity that shifts the phase of the back reflected light by one half of a wavelength substantially reduces the back reflections to the laser at the phase matching wavelength $\lambda_\Phi$.

For the purposes of describing and defining the present invention it is noted that the terms "significantly" and "substantially" are utilized herein to represent the inherent degree of uncertainty that may be attributed to any quantitative comparison, value, measurement, or other representation. The terms "significantly" and "substantially" are also utilized herein to represent the degree by which a quantitative representation may vary from a stated reference without resulting in a change in the basic function of the subject matter at issue.

It is noted that recitations herein of a component of the present invention being "configured" in a particular way, "configured" to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural characteristics of the component.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of fabricating a wavelength conversion device comprising a nonlinear optical material, an input face, an output face, and a waveguide region extending from the input face to the output face, the method comprising:
   identifying a phase matching wavelength $\lambda_\Phi$ of the wavelength conversion device, wherein the phase matching wavelength $\lambda_\Phi$ corresponds to a lasing wavelength of an input signal emitted by a laser at which the wavelength conversion device converts the frequency of the input signal at approximately a maximum conversion efficiency;
   determining an ideal poling period $\Lambda_I$ for the phase matching wavelength $\lambda_\Phi$ of the wavelength conversion device; and
   poling the nonlinear optical material by inducing into the waveguide region sequentially positioned domains comprising randomly varying domain widths defined by the ideal poling period $\Lambda_I$ plus or minus a disruption value such that:
      a Bragg resonance and corresponding back reflections of light from the wavelength conversion device poled at the randomly varying domain widths to the laser are at least an order of magnitude less than the Bragg resonance and back reflections of a nonlinear optical material poled at the ideal poling period $\Lambda_I$; and
      a conversion efficiency of the input signal by the wavelength conversion device poled with the randomly varying domain widths is at least half the maximum conversion efficiency.

2. The method as claimed in claim 1 wherein the disruption value is less than or equal to approximately 0.1 microns.

3. The method as claimed in claim 1 wherein the average width of the sequentially positioned domains is approximately equal to the ideal poling period $\Lambda_I$.

4. The method as claimed in claim 1 wherein the ideal poling period $\Lambda_I$ is 3.3 microns and the disruption value is 0.1 microns such that the domain widths of the sequentially positioned domains randomly vary at 3.2, 3.3 and 3.4 microns.

5. The method as claimed in claim 1 wherein the wavelength conversion device is configured to double the frequency of the input signal incident on the input face of the wavelength conversion device.

6. The method as claimed in claim 1 wherein the poling of the nonlinear optical material is induced by electron beam scanning, application of an electric field, or during growth of the nonlinear optical material.

7. The method as claimed in claim 1 wherein the nonlinear optical material comprises lithium niobate.

8. A method of fabricating a wavelength conversion device comprising a nonlinear optical material, an input face, an output face, and a waveguide region comprising a first half and a second half extending from the input face to the output face, the method comprising:
   identifying a phase matching wavelength $\lambda_\Phi$ of the wavelength conversion device, wherein the phase matching wavelength $\lambda_\Phi$ corresponds to a lasing wavelength of an input signal emitted by a laser at which the wavelength conversion device converts the frequency of the input signal at approximately a maximum conversion efficiency;
   determining an ideal poling period $\Lambda_I$ for the phase matching wavelength $\lambda_\Phi$ of the wavelength conversion device; and
   poling the nonlinear optical material by inducing into the waveguide region a plurality of sequentially positioned domains comprising a plurality of ideal poling domains and one or more non-ideal poling domains, wherein the non-ideal poling domains comprise a width defined by the ideal poling period $\Lambda_I$ plus or minus a discontinuity value and the ideal poling domains comprise a width defined by the ideal poling period $\Lambda_I$;
   wherein:
      the discontinuity value is selected such that the phase of light reflected by the second half of the waveguide region is in opposition of phase with the light that is reflected by the first half of the waveguide region; and
      a conversion efficiency of the input signal by the wavelength conversion device poled with the non-ideal poling domain is at least half of the maximum conversion efficiency.

9. The method as claimed in claim 8 wherein the discontinuity value is selected such that:

$$D_w \approx \frac{\frac{\lambda_{br}}{4} + k\left(\frac{\lambda_{br}}{2}\right)}{\eta};$$

wherein:
   $D_w$ is the discontinuity value;
   $\lambda_{br}$ is the wavelength of the back reflected light;
   k is an integer; and
   $\eta$ is the index of refraction of the nonlinear optical material.

10. The method as claimed in claim 8 wherein the discontinuity value is approximately an order of magnitude less than the ideal poling period $\Lambda_I$.

11. The method as claimed in claim 8 wherein the non-ideal poling domain is positioned at a midpoint of the waveguide region within the nonlinear optical material.

12. The method as claimed in claim 8 wherein the discontinuity value is approximately 0.122 microns.

13. The method as claimed in claim 8 wherein the ideal poling period $\Lambda_I$ is approximately 3.3 microns and the domain width of the non-ideal poling domain is approximately 3.422 microns.

14. A wavelength conversion device comprising a nonlinear optical material, an input face, an output face, and a waveguide region extending from the input face to the output face comprising a plurality of sequentially positioned domains having randomly varying domain widths defined by an ideal poling period $\Lambda_I$ plus or minus a disruption value, wherein:

the ideal poling period $\Lambda_I$ establishes a phase matching wavelength $\lambda_\Phi$ at which the wavelength conversion device converts the frequency of an input signal emitted by a laser at a maximum conversion efficiency; and the disruption value is less than the ideal poling period $\Lambda_I$ such that:

a Bragg resonance and corresponding back reflections of light from the wavelength conversion device poled at the randomly varying domain widths to the laser are at least an order of magnitude less than the Bragg resonance and back reflections of a nonlinear optical material poled at the ideal poling period $\Lambda_I$; and a conversion efficiency of the input signal by the wavelength conversion device having randomly varying domain widths is at least half the maximum efficiency.

15. The wavelength conversion device as claimed in claim 14 wherein the disruption value is less than or equal to approximately 0.1 microns.

16. The wavelength conversion device as claimed in claim 14 wherein the average width of the sequentially positioned domains is approximately equal to the ideal poling period $\Lambda_I$.

17. The wavelength conversion device as claimed in claim 14 wherein the ideal poling period $\Lambda_I$ is 3.3 microns and the disruption value is 0.1 microns such that the domain widths of the sequentially positioned domains randomly vary at 3.2, 3.3 and 3.4 microns.

18. A wavelength conversion device comprising a nonlinear optical material, an input face, an output face, and a waveguide region comprising a first half and a second half extending from the input face to the output face comprising a plurality of sequentially positioned domains comprising a plurality of ideal poling domains and one or more non-ideal poling domains;

wherein:

the non-ideal poling domains comprise a width defined by the ideal poling period $\Lambda_I$ plus or minus a discontinuity value and the ideal poling domains comprise a width defined by the ideal poling period $\Lambda_I$; and the discontinuity value is less than the ideal poling period $\Lambda_I$ such that:

the phase of light reflected by the second half of the waveguide region is in opposition of phase with the light that is reflected by the first half of the waveguide region; and a conversion efficiency of the input signal by the wavelength conversion device poled with the non-ideal poling domain is at least half of the maximum conversion efficiency.

19. The wavelength conversion device as claimed in claim 18 wherein:

$$D_w \approx \frac{\frac{\lambda_{br}}{4} + k\left(\frac{\lambda_{br}}{2}\right)}{\eta};$$

wherein:

$D_w$ is the discontinuity value;

$\lambda_{br}$ is the wavelength of the back reflected light;

k is an integer; and $\eta$ is the index of refraction of the nonlinear optical material.

20. The wavelength conversion device as claimed in claim 18 wherein the discontinuity value is approximately an order of magnitude less than the ideal poling period $\Lambda_I$.

21. The wavelength conversion device as claimed in claim 19 wherein the ideal poling period $\Lambda_I$ is approximately 3.3 microns and the domain width of the intermediate portion is approximately 3.422 microns.

* * * * *